(12) United States Patent
Nishino et al.

(10) Patent No.: US 9,770,650 B2
(45) Date of Patent: Sep. 26, 2017

(54) GAME PROGRAM AND INFORMATION PROCESSING DEVICE

(71) Applicant: DeNA Co., Ltd., Tokyo (JP)

(72) Inventors: Kohei Nishino, Tokyo (JP); Takashi Ninjouji, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 206 days.

(21) Appl. No.: 14/643,924

(22) Filed: Mar. 10, 2015

(65) Prior Publication Data
US 2015/0251087 A1 Sep. 10, 2015

(30) Foreign Application Priority Data

Mar. 10, 2014 (JP) .................................. 2014-046197

(51) Int. Cl.
| | |
|---|---|
| *A63F 9/24* | (2006.01) |
| *A63F 13/2145* | (2014.01) |
| *A63F 13/426* | (2014.01) |
| *A63F 13/833* | (2014.01) |

(52) U.S. Cl.
CPC ........ *A63F 13/2145* (2014.09); *A63F 13/426* (2014.09); *A63F 13/833* (2014.09)

(58) Field of Classification Search
CPC ... A63F 13/2145; A63F 13/833; A63F 13/426
See application file for complete search history.

(56) References Cited

U.S. PATENT DOCUMENTS 5,014,327 A * 5/1991 Potter .................. G06K 9/6276
                                                      382/218
8,558,792 B2 * 10/2013 Momose ................. A63F 13/10
                                                      345/162
(Continued)

FOREIGN PATENT DOCUMENTS

| JP | 3839354 B | 1/2004 |
|---|---|---|
| JP | 2005-204754 A | 8/2005 |

(Continued)

OTHER PUBLICATIONS

Japanese Patent Application No. 2014-046197: Office Action mailed on May 7, 2014.

*Primary Examiner* — Dmitry Suhol
*Assistant Examiner* — Carl V Larsen
(74) *Attorney, Agent, or Firm* — Procopio, Cory, Hargreaves & Savitch LLP

(57) ABSTRACT

The game program according to the present invention directs a computer to execute processes whereby a graphic pattern input is accepted in response to a pointing location on a game screen being moved as a result of manipulation by a player; probabilities are calculated, with which a graphic pattern inferred from a pointing location trajectory matches each of respective multiple preset graphic patterns in a state in which the movement of the pointing location is maintained; a graphic pattern satisfying a preset criterion is selected from among the multiple graphic patterns based on the result of calculating a probability of match for each of the graphic patterns; and the action of a player character operated by the player is controlled in accordance with the character action associated with the selected graphic pattern.

5 Claims, 8 Drawing Sheets

(56) References Cited

U.S. PATENT DOCUMENTS

| | | | | |
|---|---|---|---|---|
| 2005/0208993 A1* | 9/2005 | Yoshizawa | .......... | G06F 3/04883 463/20 |
| 2006/0030384 A1* | 2/2006 | Yoshizawa | .......... | G07F 17/3209 463/7 |
| 2006/0227139 A1* | 10/2006 | Momose | ................ | A63F 13/10 345/441 |
| 2012/0013704 A1* | 1/2012 | Sawayanagi | ............. | H04N 7/15 348/14.03 |

FOREIGN PATENT DOCUMENTS

| | | |
|---|---|---|
| JP | 2005-211242 A | 8/2005 |
| JP | 2005-253686 A | 9/2005 |
| JP | 2005-319175 A | 11/2005 |

\* cited by examiner

[FIG. 1]
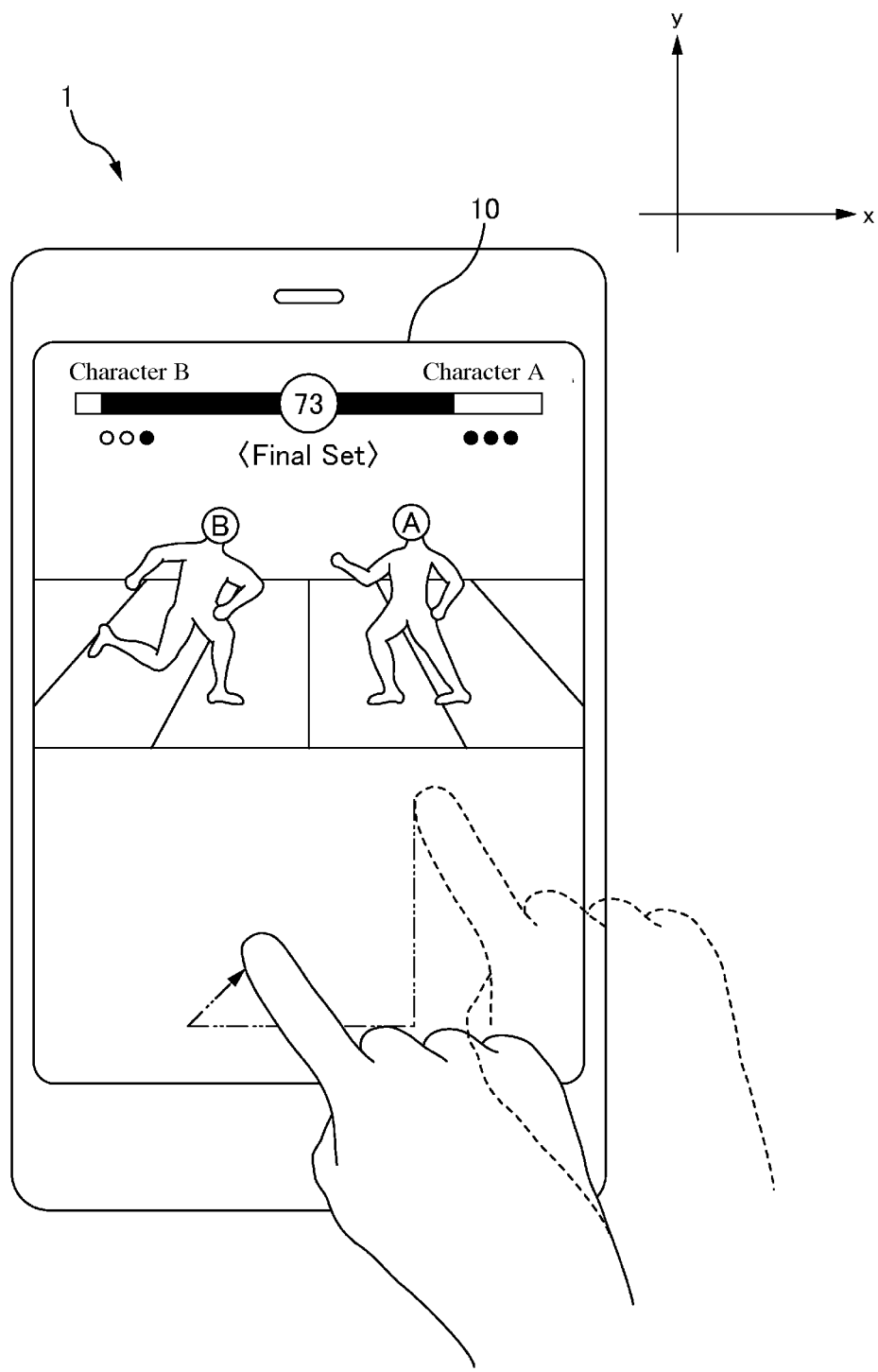

[FIG. 2]
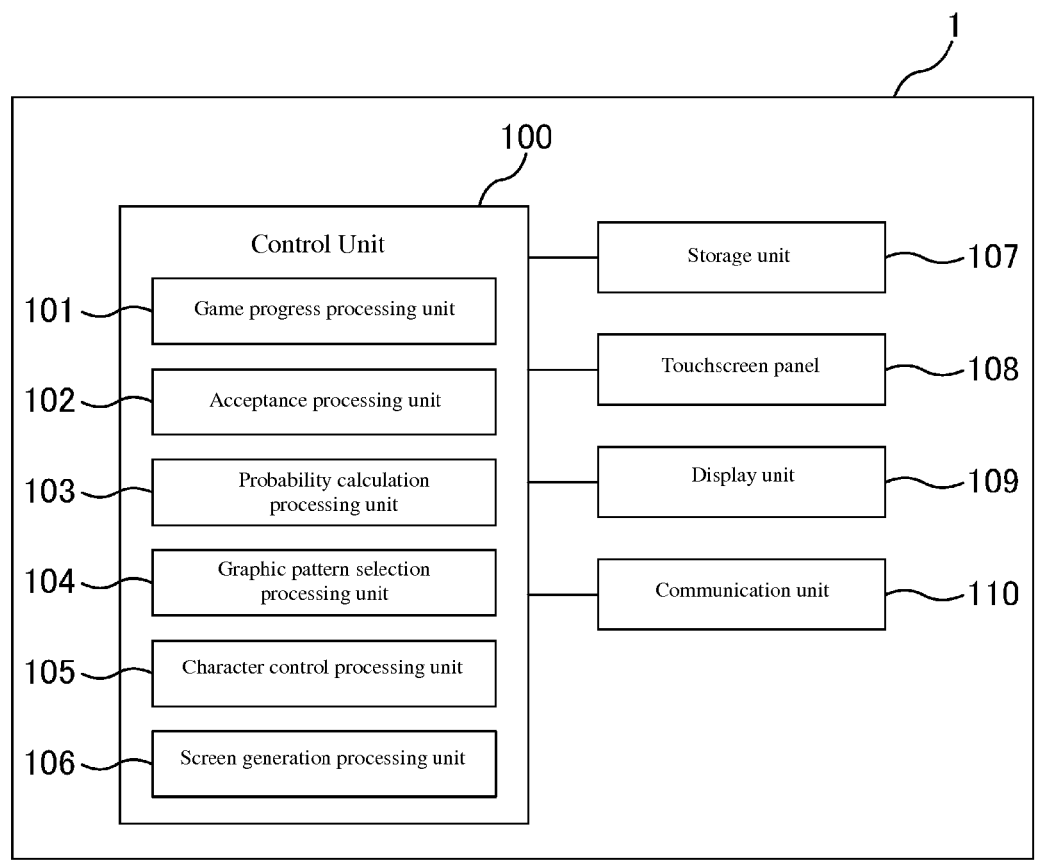

[FIG. 3]
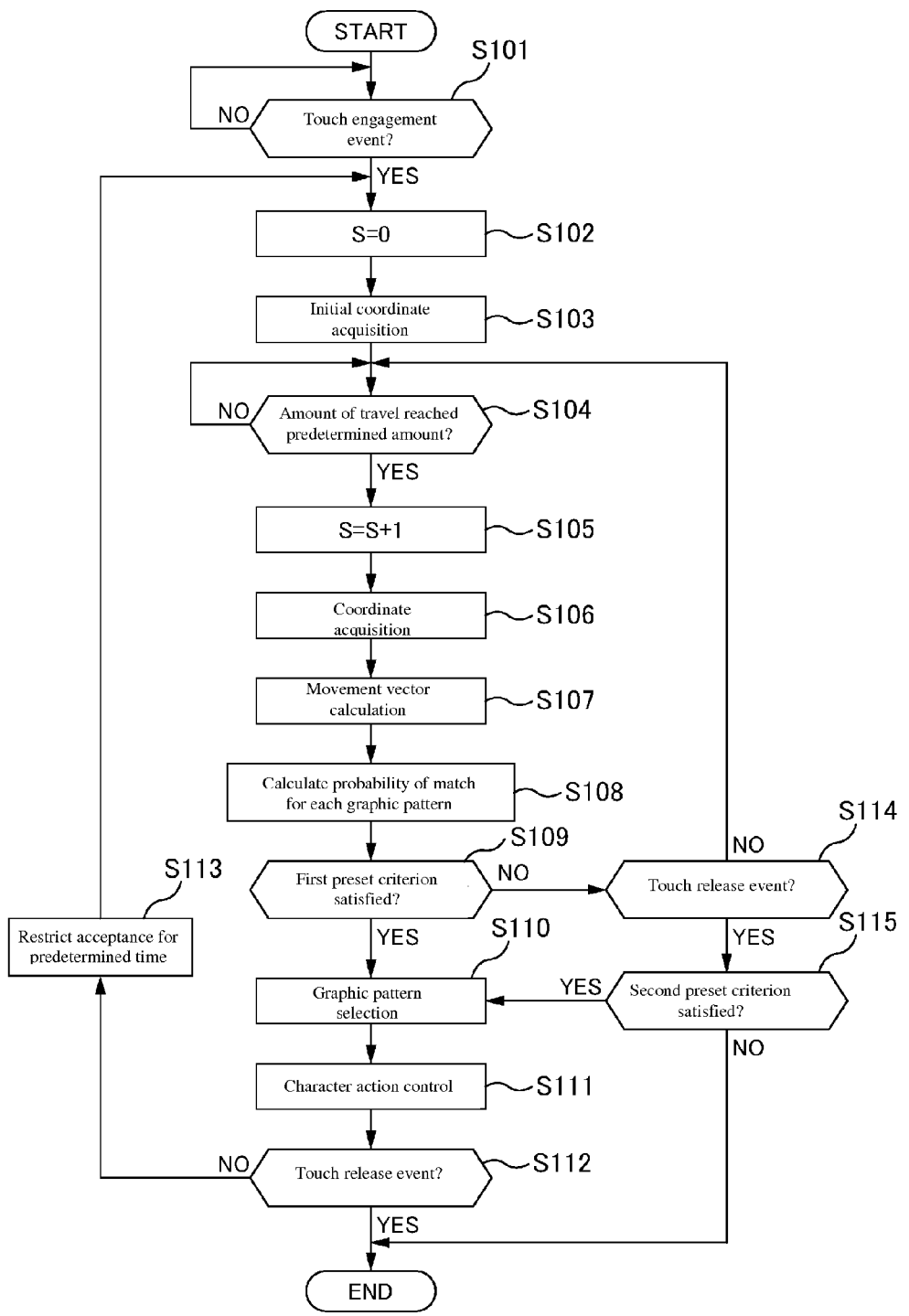

[FIG. 4]

| Sample No. | Coordinate Data |
|---|---|
| S=0 | $(x_0, y_0)$ |
| S=1 | $(x_1, y_1)$ |
| S=2 | $(x_2, y_2)$ |
| ⋮ | ⋮ |

[FIG. 5]

| Operational Command No. | Graphic Pattern | Character Action | Attack Power | ... |
|---|---|---|---|---|
| 1 | (Diagonal straight line) | Punch | 10 | ... |
| 2 | (L-shape) | Kick | 20 | ... |
| 3 | (Triangular shape) | Uppercut | 30 | ... |
| 4 | (Quadrangular shape) | Jump kick | 50 | ... |
| 5 | (Circular shape) | Lethal technique | 80 | ... |
| 6 | ⋮ | ⋮ | ⋮ | ... |

[FIG. 6]
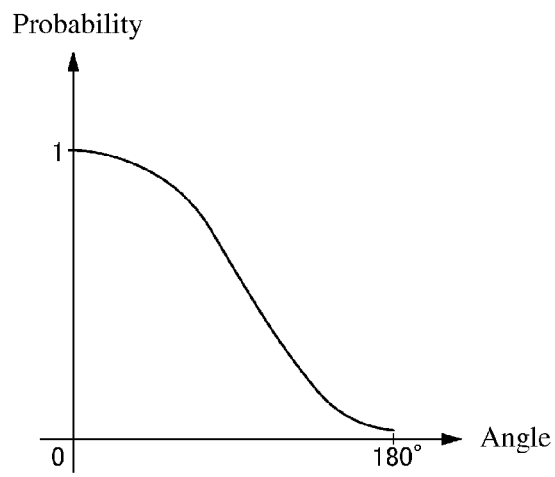
[FIG. 7]
| Sample No.<br>Segment of<br>triangular pattern | S=1 | S=2 | S=3 | ... |
|---|---|---|---|---|
| Segment 1 | 60% | 65% | 70% | ... |
| Segment 2 | 40% | 35% | 30% | ... |
| Segment 3 | 20% | 15% | 10% | ... |

[FIG. 8]
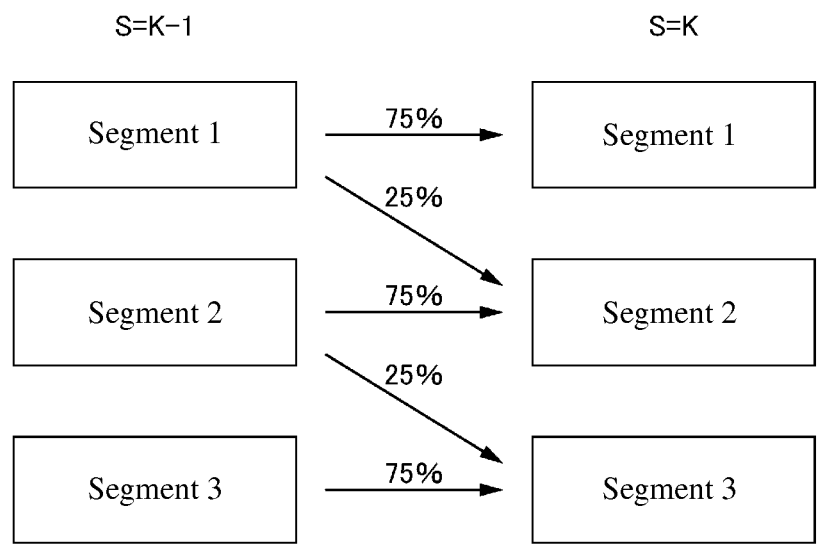

[FIG. 9]

| Sample No. | Optimum Segment |
|---|---|
| S=1 | Segment 1 |
| S=2 | Segment 1 |
| S=3 | Segment 1 |
| S=4 | Segment 1 |
| S=5 | Segment 1 |
| S=6 | Segment 1 |
| S=7 | Segment 2 |
| S=8 | Segment 2 |
| S=9 | Segment 2 |
| S=10 | Segment 2 |
| S=11 | Segment 3 |
| S=12 | Segment 3 |
| S=13 | Segment 3 |
| S=14 | Segment 3 | ns # GAME PROGRAM AND INFORMATION PROCESSING DEVICE

This application claims the benefit of foreign priority under 35 USC 119(a) based on Japanese Patent Application No. 2014-046197, filed on Mar. 10, 2014, the contents of which is incorporated herein by reference in its entirety.

BACKGROUND

1. Field

The present invention relates to a game program and an information processing device.

2. Related Art

There are well-known game programs in which the action of a character displayed on a game screen is controlled in response to operations performed by a player when said player manipulates multiple control buttons (cursor keys and attack buttons) provided on a game machine control panel (e.g., see Patent Document 1).

PRIOR ART LITERATURE

Patent Documents

[Patent Document 1]
Japanese Patent Publication No. 3839354

SUMMARY

Problems to be Solved by the Invention

When actuating the character in this manner, the player does so only by selecting and manipulating the control buttons, and, for this reason, the degree of freedom in operation is low, and there is a risk that the player may get bored.

On the other hand, in recent years, players have been able to play games using not only game machines, but also smartphones, tablet terminals, and the like. In such cases, the action of a character displayed on a game screen can be controlled when a pointing location on the game screen is moved as a result of manipulation by the player. However, despite the fact that this can increase the degree of freedom in operation, there is a risk that misrecognizing an operation, etc. may make it impossible to control the action of the character as expected and may complicate operation for the player.

The present invention has been devised with these circumstances in mind and it is an object of the invention to improve operational properties while increasing the degree of freedom of game operations.

Means for Solving the Problems

The main aspect of the present invention, which is aimed at eliminating the above-mentioned problem, is a game program (e.g., non-transitory computer readable medium containing instructions stored in a storage, the instructions in a processor of a computer) directing a computer to execute: an acceptance process which accepts a graphic pattern input in response to a pointing location on a game screen being moved as a result of manipulation by a player; a probability calculation process which calculates probabilities with which a graphic pattern inferred from a pointing location trajectory matches each of respective multiple preset graphic patterns in a state in which the movement of the pointing location is maintained; a graphic pattern selection process which selects a graphic pattern satisfying a preset criterion from among the multiple graphic patterns based on the result of calculating a probability of match for each of the graphic patterns; and a character control process which controls the action of a player character operated by the player in accordance with the character action associated with the selected graphic pattern.

Other features of the present invention will become apparent from this Description and the accompanying drawings.

BRIEF DESCRIPTION OF THE DRAWINGS

FIG. 1 A schematic diagram showing an exemplary configuration of a player terminal 1.

FIG. 2 A block diagram showing the functional configuration of the player terminal 1.

FIG. 3 A flow chart used to illustrate an example of operation of the player terminal 1.

FIG. 4 A diagram illustrating coordinate data.

FIG. 5 A diagram showing an exemplary data structure of graphic pattern information.

FIG. 6 A graph showing the relationship between the angle made by a movement vector and a segment vector and the probability of match.

FIG. 7 A diagram illustrating match probability data.

FIG. 8 A diagram illustrating self-transitions and switching transitions on the optimum path.

FIG. 9 A diagram illustrating optimum path data.

DETAILED DESCRIPTION

At least the following will become apparent from this Description and the accompanying drawings.

A game program directing a computer to execute: an acceptance process which accepts a graphic pattern input in response to a pointing location on a game screen being moved as a result of manipulation by a player; a probability calculation process which calculates probabilities with which a graphic pattern inferred from a pointing location trajectory matches each of respective multiple preset graphic patterns in a state in which the movement of the pointing location is maintained; a graphic pattern selection process which selects a graphic pattern satisfying a preset criterion from among the multiple graphic patterns based on the result of calculating a probability of match for each of the graphic patterns; and a character control process which controls the action of a player character operated by the player in accordance with the character action associated with the selected graphic pattern.

In accordance with such a game program, the likelihood of misrecognition of game operations can be reduced because when a player's graphic pattern input is accepted, a graphic pattern is inferred based on the result of probability-of-match calculations. In addition, since the graphic pattern is identified in a state in which the movement of the pointing location is maintained, the character can be actuated without terminating the movement of the pointing location.

In addition, in said game program, the acceptance process may be adapted such that, after selecting the graphic pattern via the graphic pattern selection process, graphic pattern input is not accepted for a predetermined time even if the pointing location on the game screen continues to move due to player manipulation.

The term "game program" includes, but is not limited to, a non-transitory computer readable medium containing instructions stored in a storage, the instructions in a processor of a computer.

Such a game program makes it possible to actuate characters in succession because the graphic patterns can be identified in a successive manner.

In addition, in said game program, in a state in which the pointing location has stopped moving without any of the multiple graphic patterns satisfying the preset criterion, the graphic pattern selection process may be adapted to select a pattern from among the multiple graphic patterns based on the result of calculating probabilities of match for each of the graphic patterns.

In accordance with such a game program, the graphic pattern is still identified even at the moment when the pointing location has stopped moving, thereby making it possible to actuate the character.

In addition, in said game program, the multiple preset graphic patterns include a polygonal pattern composed of multiple segments, and the probability calculation process may be adapted to calculate probabilities with which the direction of a movement vector obtained from a pointing location trajectory matches the direction of segment vectors aligned with each of the respective segments forming the polygonal pattern, as well as calculate a probability of match for the polygonal pattern based on the result of calculating a probability of match for each of the segment vectors.

In accordance with such a game program, a probability of match is calculated for each segment forming the polygonal pattern, thereby making it possible to increase the precision with which inferences are made with regard to polygonal patterns.

In addition, in this game program, the character control process may be adapted to control the action of the player character such that the higher the probability of match for a graphic pattern satisfying the preset criterion, the greater the advantage gained by the player in the game.

Such a game program can compensate for the fact that graphic pattern input becomes more difficult and less advantageous for the player as the probability of match increases.

In addition, an information processing device comprising: an acceptance processing unit which accepts graphic pattern input in response to a pointing location on a game screen being moved as a result of manipulation by a player; a probability calculation processing unit which calculates probabilities with which a graphic pattern inferred from a pointing location trajectory matches each of respective multiple preset graphic patterns in a state in which the movement of the pointing location is maintained; a graphic pattern selection processing unit which selects a graphic pattern satisfying a preset criterion from among the multiple graphic patterns based on the result of calculating a probability of match for each of the graphic patterns; and a character control processing unit which controls the action of a player character operated by the player in accordance with the character action associated with the selected graphic pattern.

Such an information processing device makes it possible to increase the degree of freedom during game operations while improving operating characteristics.

EMBODIMENTS

<<Configuration of Player Terminal 1>>

FIG. 1 is a schematic diagram showing an exemplary configuration of a player terminal 1. The player terminal 1 according to this embodiment is an information processing device, such as a smartphone, a tablet terminal, or the like. As shown on the game screen 10 displayed on the player terminal 1, a player-operated player character is battling an opponent character. Also, the action of the player character is controlled when the pointing location (contact location) on the game screen 10 is moved as a result of an instruction issued by the player with a touch gesture.

FIG. 2 is a block diagram showing the functional configuration of the player terminal 1. The player terminal 1 according to this embodiment has a control unit 100, a storage unit 107, a touchscreen panel 108, a display unit 109, and a communication unit 110.

The control unit 100 which, along with forwarding data between the components, exercises overall control over the player terminal 1, is implemented using a CPU (Central Processing Unit) running a predetermined program stored in memory. The control unit 100 of the present embodiment is provided with a game progress processing unit 101, an acceptance processing unit 102, a probability calculation processing unit 103, a graphic pattern selection processing unit 104, a character control processing unit 105, and a screen generation processing unit 106.

The game progress processing unit 101 has the function of carrying out processing required to control the progress of the game. The game progress processing unit 101 of the present embodiment controls the progress of a match-type fighting game in which a player character is actuated in response to a player's operations on a battlefield configured in a virtual space in order to decide the winner of a battle with an opponent character.

The acceptance processing unit 102 has the function of carrying out processing required to accept input produced by various operations performed by the player from the touchscreen panel 108. The acceptance processing unit 102 of this embodiment accepts graphic pattern input in response to a pointing location on the game screen being moved as a result of manipulation by a player.

The probability calculation processing unit 103 has the function of calculating a probability (likelihood) of match for a preset graphic pattern. The probability calculation processing unit 103 of the present embodiment calculates probabilities with which a graphic pattern inferred from a trajectory of the contact location matches each of respective multiple preset graphic patterns when the contact location (pointing location) on the game screen is moved as a result of a player's touch gesture.

The graphic pattern selection processing unit 104 has the function of carrying out processing whereby a graphic pattern satisfying a preset criterion is selected from among multiple preset graphic patterns. Once a probability of match has been calculated for each of the graphic patterns by the probability calculation processing unit 103, the graphic pattern selection processing unit 104 of the present embodiment determines the graphic pattern based on the result of the calculations.

The character control processing unit 105 has the function of carrying out processing required to control the action of the character. Once the graphic pattern has been selected by graphic pattern selection processing unit 104, the character control processing unit 105 of the present embodiment controls the action of the player-operated player character in accordance with the character action associated with the graphic pattern.

The screen generation processing unit 106 has the function of carrying processing required to generate screen data used to display a game screen on the display unit 109.

The storage unit 107, which has a ROM (Read Only Memory), i.e. a read-only storage area where operating system software is stored, and a RAM (Random Access Memory), i.e. a rewritable storage area used as a work area for arithmetic processing by the control unit 100, is implemented using a flash memory, a hard disk, or another non-volatile storage device. The storage unit 107 of the present embodiment stores the game program of the match-type fighting game and various types of data utilized when actuating a character in the match-type fighting game.

The touchscreen panel 108, which is in an example of an operation input unit used by the player to enter various operations (for example, graphic pattern input), detects touch gestures performed by the player on the game screen 10 displayed on the display unit 109.

The display unit 109, which is used to display a game screen in response to commands from the control unit 100, is implemented, for example, as a liquid crystal display (LCD: Liquid Crystal Display), or the like.

The communication unit 110, which is used for exchanging information with a server device or other player terminals, possesses receiver functionality for receiving various types of data and signals transmitted from the server device and so forth, and transmitter functionality for transmitting various types of data and signals to the server device and so forth, in response to commands from the control unit 100.

<<Operation of Player Terminal 1>>

When the game screen 10 illustrated in FIG. 1 is displayed on the player terminal 1, the acceptance processing unit 102 accepts graphic pattern input when a contact location (pointing location) on the game screen 10 is moved as a result of a touch gesture (pointing gesture) performed by the player on the touchscreen panel 108. Once a graphic pattern input has been accepted by the acceptance processing unit 102, the player terminal 1 determines the action of the character by performing contact location sampling for each prescribed interval (setting a sample number "s") and inferring a graphic pattern corresponding to the trajectory of the contact location. The various types of processing used to control the action of a player character in response to graphic patterns input by a player while playing a battle game will be discussed in specific detail below.

FIG. 3 is a flow chart used to illustrate an example of operation of the player terminal 1.

First of all, the control unit 100, based on detection information from the touchscreen panel 108, determines whether or not a contact gesture has been input by the player on the game screen 10 (S101).

Next, if a contact gesture has been input by the player (S101: YES), the control unit 100 configures the initial sample number (s=0) (S102).

At such time, the control unit 100 uses detection information from the touchscreen panel 108 to acquire coordinate data corresponding to the initial contact location (initial coordinates) on the game screen 10 (S103). It should be noted that the control unit 100 records the coordinate data of these initial coordinates $(x_0, y_0)$ in the storage unit 107 in association with the sample number (s=0) (see FIG. 4).

Next, with the movement of the contact location being maintained, the control unit 100 determines whether or not the amount of travel has reached a predetermined amount (S104). For example, in the present embodiment, it is determined whether or not the travel distance from the initial coordinates to the current coordinates has reached 30 pixels.

Then, if the predetermined amount has been reached (S104: YES), s=s+1, i.e. the sample number is incremented by 1 (S105). At such time, the control unit 100 acquires the coordinate data of the contact location for this sampling timing based on detection information from the touchscreen 108 (S106) and records it in the storage unit 107 in association with the sample number at such time (see FIG. 4). In other words, in the present embodiment, the coordinate data of the contact location is sampled whenever the amount of travel reaches 30 pixels in a state in which the movement of the contact location is maintained in this manner.

Next, the control unit 100 calculates a movement vector corresponding to the trajectory of the contact location (S107). For example, if a movement vector is obtained for the current sample period (s=1), a vector $(x_1-x_0, y_1-y_0)$, whose start point is represented by the coordinates $(x_0, y_0)$ of the previous sampling period (s=0) and whose end point is represented by the coordinates $(x_1, y_1)$ of the current sample period (s=1), is obtained and normalized.

Next, the probability calculation processing unit 103 calculates probabilities (probabilities of match) with which the graphic pattern inferred from the trajectory of the contact location matches each of the respective multiple preset graphic patterns (S108).

As shown in FIG. 5, in the present embodiment, graphic pattern information that defines character actions is stored in advance in the storage unit 107 in association with each of the graphic patterns. The graphic patterns include diagonal straight lines, L-shapes, triangular shapes, quadrangular shapes, circular shapes (defined using octagonal shapes), and so forth, and coordinate data for each apex, as well as order data, is configured respectively for each type. For example, coordinate data (x, y) for each of the three apexes 0, 1, and 2, and order data for each apex (apex 0→1→2) is configured for a triangular pattern.

The probability calculation processing unit 103 uses this graphic pattern information to calculate probabilities of match for various types of graphic patterns. The probability of match for a graphic pattern is calculated by calculating the probability of match for every line segment that forms the graphic pattern. Below, this will be illustrated specifically with reference to calculating a probability of match for the triangular pattern among the multiple preset types of graphic patterns.

As shown in FIG. 5, the triangular pattern of the present embodiment is formed by drawing a first line segment connecting Apex 0 to Apex 1, a second line segment connecting Apex 1 to Apex 2, and a third line segment connecting Apex 2 to Apex 0 such that the apexes are connected in the order 0→1→2. Based on the coordinate data (x, y) for these apexes, the control unit 100 can obtain a vector aligned with the first line segment (a vector whose start point is Apex 0 and whose end point is Apex 1), a vector aligned with the second line segment (a vector whose start point is Apex 1 and whose end point is Apex 2), and a vector aligned with the third line segment (a vector whose start point is Apex 2 and whose end point is Apex 0).

At first, the probability calculation processing unit 103 calculates a probability of match for each line segment that forms the triangular pattern. Specifically, the probability calculation processing unit 103 calculates probabilities with which the direction of the movement vector calculated in the above-described step 107 matches the direction of the vector aligned with the first line segment, the direction of vector aligned with the second line segment, and the direction of the vector aligned with the third line segment. At such time, the probability calculation processing unit 103 obtains angles made by the movement vector and the segment vectors from each vector component and calculates a probability of match for each line segment using the graph shown in FIG. 6.

FIG. 6 is a graph illustrating the relationship between the angles made by the movement vector and the segment vectors and the probability of match. This graph is defined by a predetermined formula and configured such that, as the angle made by the movement vector and the segment vector approaches 0 degrees, the greater the probability of match for the line segment (the probability of match approaches 1), and as the angle made thereby approaches 180 degrees, the lesser the probability of match for the line segment (the probability of match approaches 0).

It should be noted that when the probability calculation processing unit 103 calculates the angles made by the movement vector and the segment vectors, the probabilities of match for the line segments may be calculated using a correction value for the angles made thereby. For example, in the beginner mode, adjustments may be made so as to increase the probability of match for a line segment by performing correction such that the calculated angle is decreased. Accordingly, even a beginner can draw graphic patterns with high precision, just like an advanced player. In addition, a probability of match for a line segment may be calculated using a correction value for the angle when, for example, a preset criterion is satisfied, such as when a bonus gauge (parameter) reaches a maximum value, or during bonus time, and the like.

When probabilities of match are calculated in this manner for the line segments forming the triangular pattern, the control unit 100 records the probability of match for each line segment in the storage unit 107 in association with the sample number used at such time (see FIG. 7).

Next, based on the probability-of-match data illustrated in FIG. 7, the probability calculation processing unit 103 identifies the optimum line segment transition (optimum path) to the current sample number by selecting the most suitable line segment (optimum line segment) from the first line segment, second line segment, and third line segment for each sample number.

For example, to illustrate this, consider a situation in which the optimum line segment is selected from the first line segment, second line segment, and third line segment during the current sampling period (s=k). Assuming that, as shown in FIG. 8, the probability of a self-transition, i.e. the probability of transitioning to the same line segment, is (75%), and the probability of a switching transition, i.e. the probability of switching to the next line segment, is (25%), the unit calculates the probability for the entire path along which transitioning from the line segment of the previous sampling period (s=k−1) to the line segment of the current sampling period (s=k) is carried out, and the line segment used when obtaining the highest-probability path is determined to be the optimum line segment. Specifically, along with obtaining a product of the probability of match for the optimum line segment of the previous sampling period (s=k−1) (see FIG. 7) with the self-transition probability (75%), a product thereof with the switching transition probability (25%) is also obtained. The optimum line segment of the current sampling period (s=k) is selected by assuming that if the former value is larger than the latter value, a self-transition may have taken place, without changes, from the optimum line segment of the previous sampling period (s=k−1), and if the latter value is larger than former value, a switching transition may have taken place from the optimum line segment of the previous sampling period (s=k−1) to the next line segment. At such time, as shown in FIG. 9, the control unit 100 records the thus selected optimum line segment in the storage unit 107 in association with the sample number (s=k). As a result of this, transition data up to the present moment is obtained, and it becomes possible to identify the optimum path for the current sample timing (s=k).

Next, the probability calculation processing unit 103 obtains a probability of match for the triangular pattern by calculating a probability for the current optimum path. The probability for the current optimum path is obtained by calculating a product of the probabilities of match for each of the optimum line segments that form the current optimum path based on the probability-of-match data shown in FIG. 7 and the transition data shown in FIG. 9.

By doing so, probabilities of match can be obtained in a similar manner for other graphic patterns. For example, in the case of a quadrangular pattern, a probability of match for the quadrangular pattern is obtained by calculating a probability of match for four line segments, and in the case of a circular pattern, a probability of match for the circular pattern is obtained by calculating a probability of match for eight line segments.

Next, when probabilities of match are calculated as described above by the probability calculation processing unit 103 respectively for each of the graphic patterns, the graphic pattern selection processing unit 104 determines whether or not a first preset criterion is satisfied for each of the respective probabilities of match (S109). Specifically, it is determined whether or not each of the respective calculated probabilities of match is greater than a preset value (for example, whether the probability is 80% or more). It should be noted that this does not need to be the case, and it is possible to identify a graphic pattern with the highest probability of match, compare this graphic pattern with other graphic patterns, and determine whether or not the difference in the probability of match exceeds a fixed value.

Subsequently, if said determination is positive (S109: YES), the graphic pattern selection processing unit 104 selects a graphic pattern satisfying the first preset criterion from among the multiple preset graphic patterns, and infers that this graphic pattern has been input by the player (S110).

Next, when the graphic pattern is selected by the graphic pattern selection processing unit 104, the character control processing unit 105 determines the character action associated with the graphic pattern based on the graphic pattern information illustrated in FIG. 5. The character control processing unit 105 then acquires motion data corresponding to the character action from the storage unit 107 and actuates the player character based on the motion data (S111).

Subsequently, based on detection information from the touchscreen panel 108, the control unit 100 determines whether or not the input of a contact gesture by the player on the game screen 10 has stopped (S112). If said determination is positive (S112: YES), the process is terminated, and if the determination is negative (S112: NO), then, after going through Step 113, the process returns to Step 102 and the subsequent processing is repeated. At step 113, graphic pattern input by the player is restricted and not accepted for a predetermined time even in a state in which the movement of the contact location continues. Accordingly, the control unit 100 can be made to recognize of the boundary between the current graphic pattern input and the next graphic pattern input, thereby allowing the player to enter the next graphic pattern without removing his/her finger from the game screen 10.

On the other hand, if the determination at step 109 is negative (S109: NO), the control unit 100, based on detection information from the touchscreen panel 108, determines whether or not the player's contact gesture on the game screen 10 is finished (S114).

If said determination is negative (S114: NO), the movement of the contact location is maintained, and, therefore, the process returns to Step 104 and the subsequent processing is repeated. If said determination is positive (S114: YES), the control unit 100 determines whether or not a second preset criterion is satisfied with regard to the respective probabilities of match for each of the graphic patterns calculated in Step 108 (S115). Specifically, it identifies a graphic pattern with the highest probability of match, compares this graphic pattern with other graphic patterns, and determines whether or not the difference in the probability of match exceeds a fixed value.

Subsequently, if said determination is positive (S115: YES), the graphic pattern selection processing unit 104 selects a graphic pattern satisfying the second preset criterion from among the multiple preset graphic patterns and infers that this graphic pattern has been input by the player (S110). If said determination is negative (S115: NO), this process is terminated.

As described above, according to the game program of the present embodiment, when the contact location on the game screen starts moving as a result of a player's touch gesture, the graphic pattern input by the player is inferred based on the result of calculating probabilities of match for preset graphic patterns. Along with allowing for prompt identification of graphic patterns, this makes it possible to minimize the likelihood of misrecognition of game operations. In addition, since graphic patterns are identified in a state in which the movement of the pointing location is maintained, the player can actuate the player character without terminating the movement of the pointing location (without removing the finger that is in contact with the game screen).

===Other Embodiments===

The foregoing embodiment was intended to facilitate the understanding of the present invention and is not to be construed as limiting of the present invention. The present invention can be modified and improved without departing from its spirit and the present invention includes equivalents thereto. In particular, the embodiments described below are also included in the present invention.

<Graphic Patterns>

Although in the present embodiment described above the types of the preset graphic patterns have been explained with reference to diagonal straight lines, L-shapes, triangular shapes, quadrangular shapes, and circular shapes (defined using octagonal shapes), the present invention is not limited to these shapes.

In addition, although the present embodiment described above has been explained with reference to a case in which character actions are configured in association with graphic patterns, as shown in FIG. 5, the present invention is not limited thereto. For example, dummy graphic patterns, with which no character actions whatsoever are associated, may be pre-configured as graphic patterns so as to adjust the degree of difficulty for the player during input of graphic patterns.

<Sampling>

Although the present embodiment described above has been explained with reference to a situation in which the coordinate data of the contact location is sampled whenever the amount of travel reaches a predetermined amount (for example, 30 pixels) in a state in which the movement of the contact location is maintained, the present invention is not limited thereto. For example, the coordinate data of the contact location may be sampled at regular time intervals after the movement of the contact location starts.

<Character Actions>

In the present embodiment described above the character control processing unit 105 may control the action of the player character such that the higher the probability of match for a graphic pattern satisfying the first preset criterion (the higher the precision with which a graphic pattern is drawn), the greater the advantage gained by the player in the game. For example, when the player character is caused to perform an "uppercut" corresponding to the "triangular pattern", as shown in FIG. 5, the value of the attack strength parameter may be configured to become progressively higher than the normal value of "30" as the probability of match for "the triangular pattern" becomes higher. This can compensate for the fact that graphic pattern input becomes more difficult and less advantageous for the player as the probability of match increases. It should be noted that, at such time, adjustments can be made such that the probability of match for a graphic pattern is increased. For example, when a preset criterion is satisfied, such as when the beginner mode is selected, when the bonus gauge (parameter) reaches a maximum value, or during bonus time or the like, even if the probability of match for a graphic pattern is low, the probability of match may be corrected to make it higher.

In addition, in the present embodiment described above, there may be provided a time measurement unit measuring the time elapsed from the start of a touch gesture to the identification of a graphic pattern, and the character control processing unit 105 may control the action of the player character such that the player gains an advantage in the game depending on the elapsed time. For example, if the player enters graphic patterns slowly, the value of the attack strength parameter may be configured progressively lower than the normal value as the elapsed time becomes longer. Also, for example, if the player enters complex graphic patterns quickly, then the value of the attack strength parameter may be configured progressively higher than the normal value as the elapsed time becomes shorter.

In addition, in the present embodiment described above, there may be provided a time measurement unit measuring the time elapsed from the start of a touch gesture to the identification of a graphic pattern and the player character may be controlled such that, in a situation where a first graphic pattern includes a second graphic pattern (for example, a W-shape and a V-shape), if the first graphic pattern (a W-shape) is identified within a predetermined time, then only the character action corresponding to the first graphical pattern is carried out, even though the second graphic pattern (a V-shape) might have been identified first.

<Player Terminal 1>

Although the present embodiment described above has been described with reference to smartphones, tablet terminals, and other information processing devices having with a touchscreen panel, the present invention is not limited thereto. For example, it may be a game machine, or the like, provided with functionality that enables it to recognize a pointing location on a game screen indicated by player manipulation using an acceleration sensor, an optical sensor sensing infrared radiation, a CCD camera, or the like. It should be noted that the information processing device is an example of a computer equipped with a processor and a memory.

DESCRIPTION OF THE REFERENCE NUMERALS

1 Player terminal
10 Game screen

100 Control unit
101 Game progress processing unit
102 Acceptance processing unit
103 Probability calculation processing unit
104 Graphic pattern selection processing unit
105 Character control processing unit
106 Screen generation processing unit
107 Storage unit
108 Touchscreen panel
109 Display unit
110 Communication unit

The invention claimed is:

1. A non-transitory computer readable medium containing instructions stored in a storage, the instructions in a processor of a computer, the instructions comprising:
   an acceptance process which accepts a graphic pattern input in response to a pointing location on a game screen being moved as a result of a player's touch gesture;
   a probability calculation process which calculates probabilities with which an unfinished graphic pattern identified from a pointing location trajectory matches each of respective preset finished graphic patterns in a state in which the movement of the pointing location is maintained;
   a graphic pattern selection process which selects a finished graphic pattern satisfying a preset criterion from among the multiple finished graphic patterns based on the result of calculating a probability of match for each of the finished graphic patterns;
   a character control process which controls the action of a player character operated by the player in accordance with the character action associated with the selected finished graphic pattern;
   a determination process which, upon selection of a finished graphic pattern during the graphic pattern selection process, determines whether the pointing location has stopped moving based on whether or not the player's touch gesture has been continued without a touch release event; and
   a restriction process which, if said determination is negative, imposes restrictions such that graphic pattern input is not accepted during the acceptance process for a predetermined time during the period when the movement of the pointing location is continuously maintained.

2. The non-transitory computer readable medium according to claim 1, wherein, in a state in which the pointing location has stopped moving without any of the multiple finished graphic patterns satisfying the preset criterion, the graphic pattern selection process selects a pattern from among the multiple finished graphic patterns based on the result of calculating probabilities of match for each of the finished graphic patterns.

3. The non-transitory computer readable medium according to claim 1, wherein the multiple preset finished graphic patterns include a polygonal pattern composed of multiple segments, and the probability calculation process calculates probabilities with which the direction of a movement vector obtained from a pointing location trajectory matches the direction of segment vectors aligned with each of the respective segments forming the polygonal pattern, and also calculates a probability of match for the polygonal pattern based on the result of calculating a probability of match for each of the segment vectors.

4. The non-transitory computer readable medium according to claim 1, wherein the character control process controls the action of the player character such that the higher the probability of match for a finished graphic pattern satisfying the preset criterion, the greater the advantage gained by the player in the game.

5. An information processing device comprising:
   an acceptance processing unit which accepts a graphic pattern input in response to a pointing location on a game screen being moved as a result of a player's touch gesture;
   a probability calculation processing unit which calculates probabilities with which an unfinished graphic pattern identified from a pointing location trajectory matches each of respective preset finished graphic patterns in a state in which the movement of the pointing location is maintained;
   a graphic pattern selection processing unit which selects a finished graphic pattern satisfying a preset criterion from among the multiple finished graphic patterns based on the result of calculating a probability of match for each of the finished graphic patterns;
   a character control processing unit which controls the action of a player character operated by the player in accordance with the character action associated with the selected finished graphic pattern;
   a determination processing unit which, upon selection of a finished graphic pattern during the graphic pattern selection process, determines whether the pointing location has stopped moving based on whether or not the player's touch gesture has been continued without a touch release event; and
   a restriction processing unit which, if said determination is negative, imposes restrictions such that graphic pattern input is not accepted during the acceptance process for a predetermined time during the period when the movement of the pointing location is continuously maintained.

* * * * *